(12) United States Patent
Nguyen et al.

(10) Patent No.: US 8,177,176 B2
(45) Date of Patent: May 15, 2012

(54) HANGER BAR FOR RECESSED LIGHTING FIXTURES

(75) Inventors: Huan Nguyen, Gardena, CA (US); Dwight Santiago, Summerfield, NC (US); Dan Dix, Irvine, CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 287 days.

(21) Appl. No.: 12/617,473

(22) Filed: Nov. 12, 2009

(65) Prior Publication Data

US 2010/0110705 A1 May 6, 2010

Related U.S. Application Data

(63) Continuation-in-part of application No. 12/045,604, filed on Mar. 10, 2008, now Pat. No. 7,810,775.

(60) Provisional application No. 60/894,416, filed on Mar. 12, 2007.

(51) Int. Cl.
*E04G 25/00* (2006.01)

(52) U.S. Cl. .................. 248/200.1; 248/298.1; 248/323; 248/342; 248/343; 248/547; 248/906

(58) Field of Classification Search ............... 248/200.1, 248/906, 343, 317, 547, 546, 909, 298.1, 248/342, 323; 362/365, 362, 366
See application file for complete search history.

(56) References Cited

U.S. PATENT DOCUMENTS

| | | | |
|---|---|---|---|
| 1,756,361 A | 4/1930 | Johnson | |
| 5,452,816 A | 9/1995 | Chan et al. | |
| 5,505,419 A | 4/1996 | Gabrius | |
| 6,030,102 A | 2/2000 | Gromotka | |
| 6,076,788 A | 6/2000 | Akiyama | |
| 6,341,466 B1 | 1/2002 | Kehoe et al. | |
| 7,654,495 B2 * | 2/2010 | Adrian et al. | 248/200.1 |
| 7,784,754 B2 * | 8/2010 | Nevers et al. | 248/200.1 |
| 7,810,775 B2 * | 10/2010 | Dal Ponte et al. | 248/343 |
| 7,874,539 B2 * | 1/2011 | Wright et al. | 248/547 |
| 2005/0230589 A1 | 10/2005 | Wronski | |

(Continued)

OTHER PUBLICATIONS

May 26, 2011 Canadian Examiner Report for CIPO Counterpart Application No. 2,691,480.

*Primary Examiner* — Amy J Sterling
(74) *Attorney, Agent, or Firm* — Paul Y. Feng; The Eclipse Group LLP

(57) ABSTRACT

A hanger bar for supporting a recessed light fixture is attachable to ceiling joists or a T-bar grid of a drop down ceiling. First and second bars of the hanger bar slide and telescope. First and second spring clips are detachably coupled to the brackets at the ends of the first and second bars, respectively. Each of the first and second clips has a pair of downwardly extending arms bent inwardly toward one another, a first leg extending from a first arm, a second leg extending from a second arm, and an outwardly-extending foot on the second leg. The spring clips snap on to the T-bar grid. Each bracket includes a nail that is angled away from the hanger bar and downward so that the nail head is below the level of the hanger bar. The angled nails enable easy hammer strikes to attach the hanger bar to ceiling joists without accidental hammer blows to the hanger bar. The bracket may be discrete from the hanger bar but attached via tox clinching or a tab pass-through attachment.

20 Claims, 17 Drawing Sheets

U.S. PATENT DOCUMENTS

| | | |
|---|---|---|
| 2005/0247842 A1 | 11/2005 | Wronski |
| 2006/0012998 A1 | 1/2006 | Blincoe |
| 2007/0075206 A1* | 4/2007 | Wright et al. ................. 248/343 |
| 2008/0224008 A1 | 9/2008 | Dal Ponte et al. |

* cited by examiner

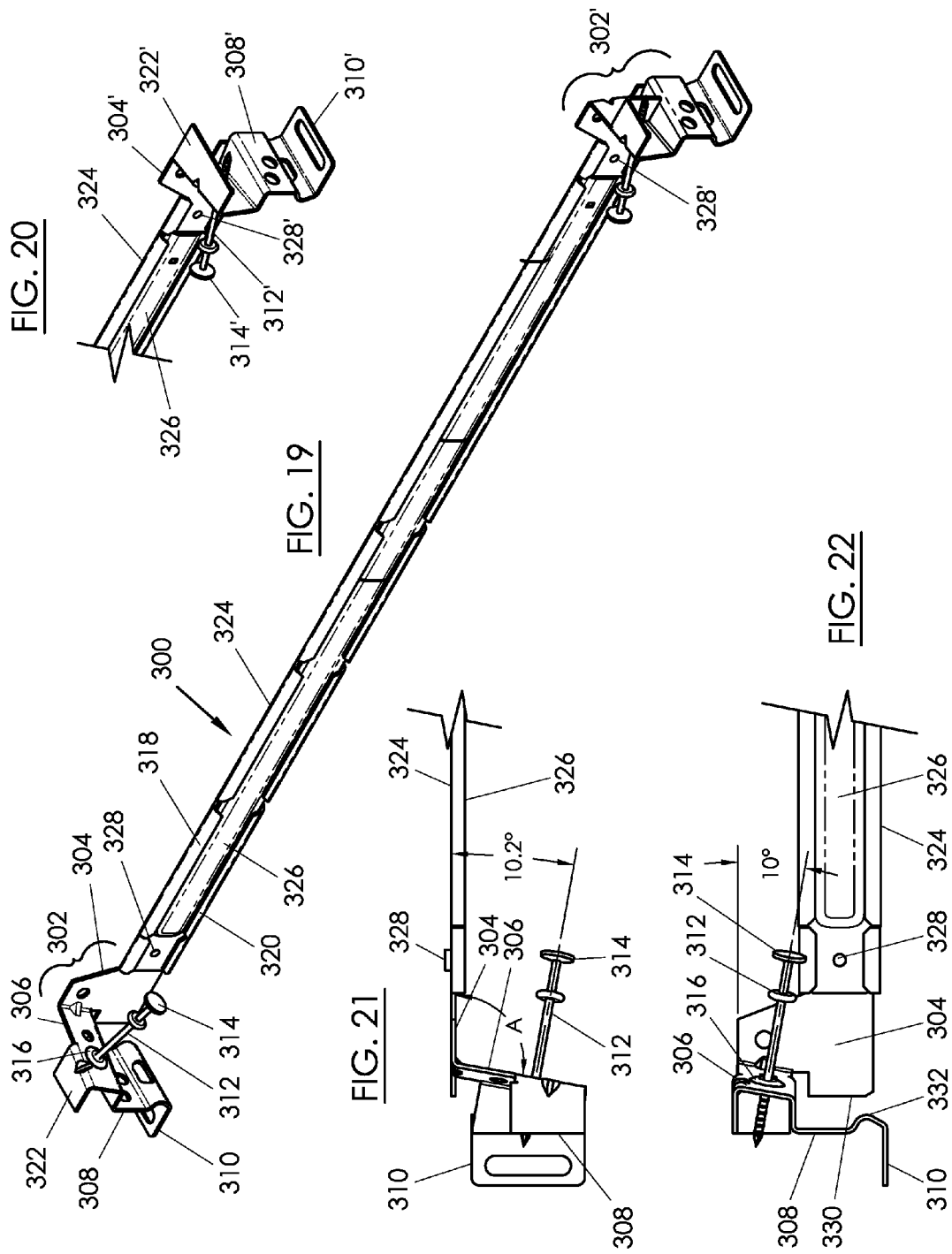

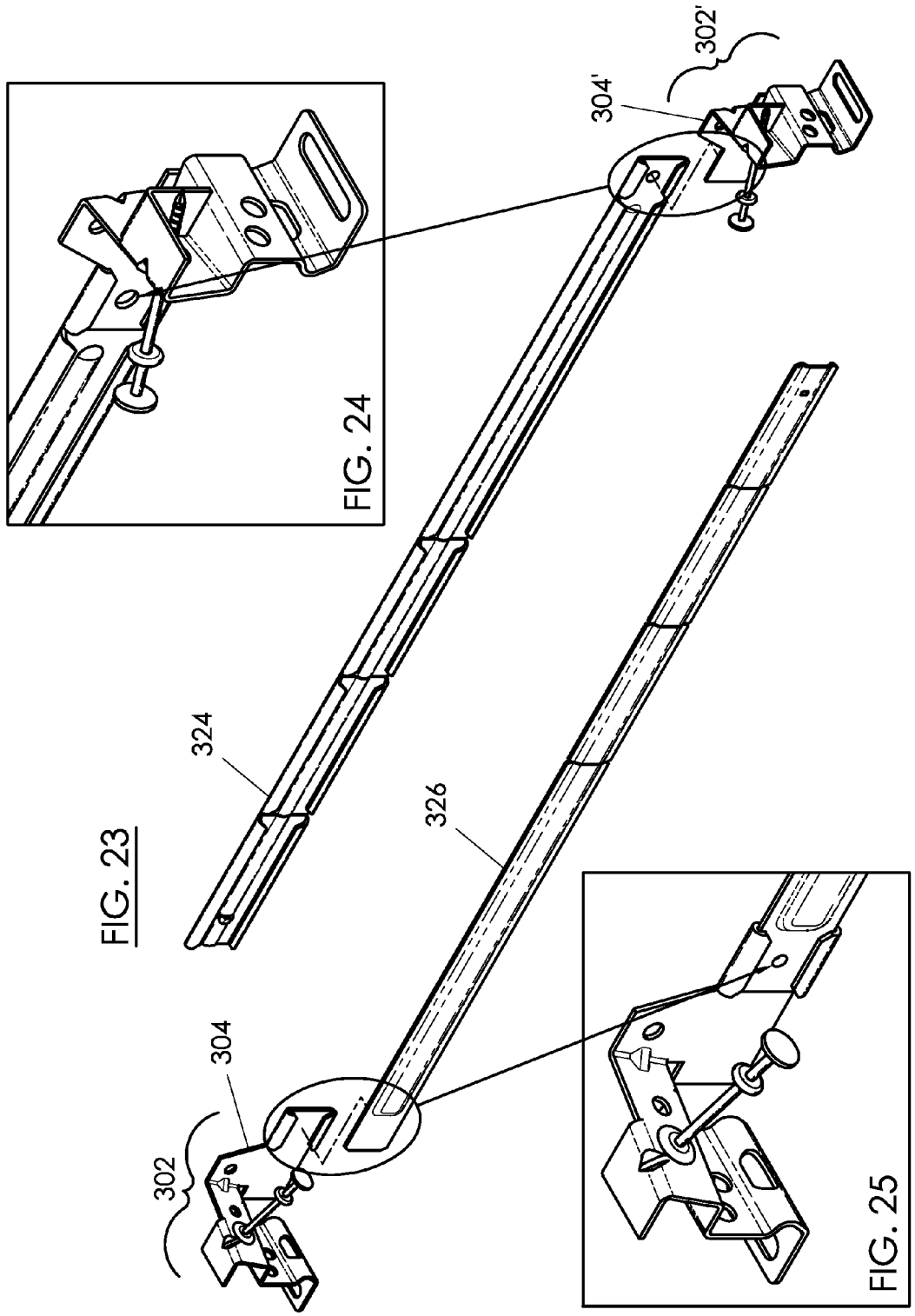

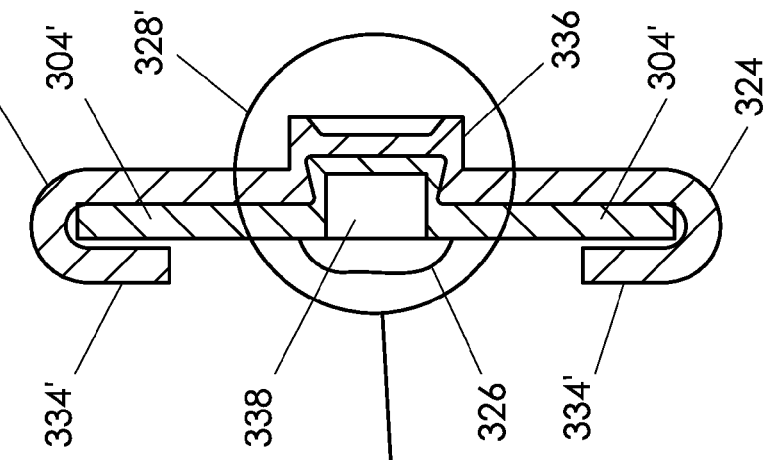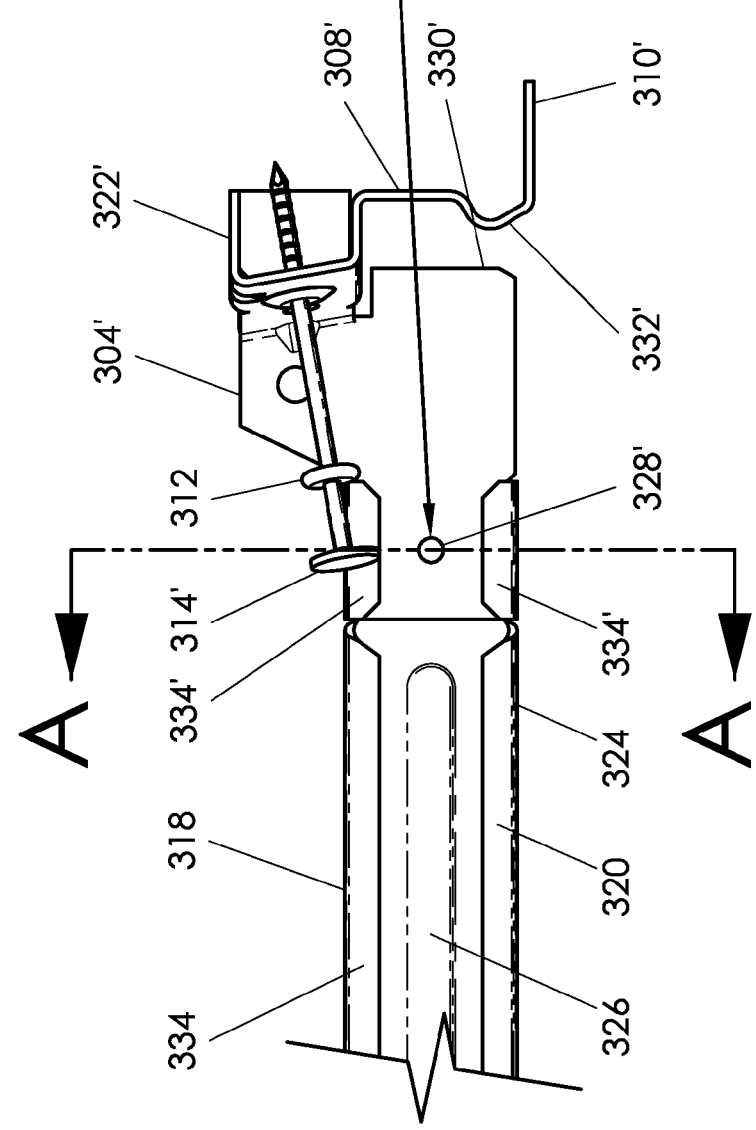

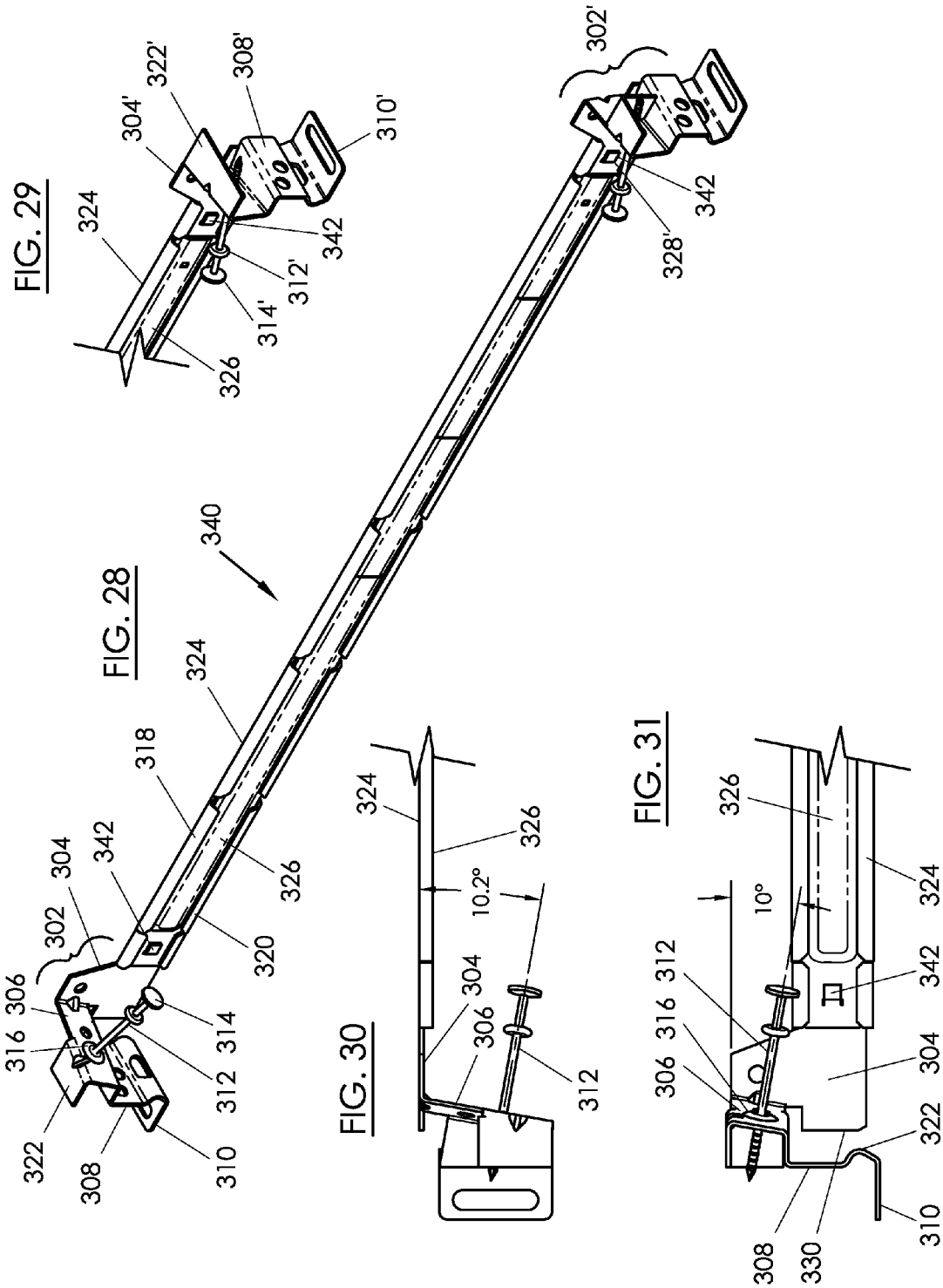

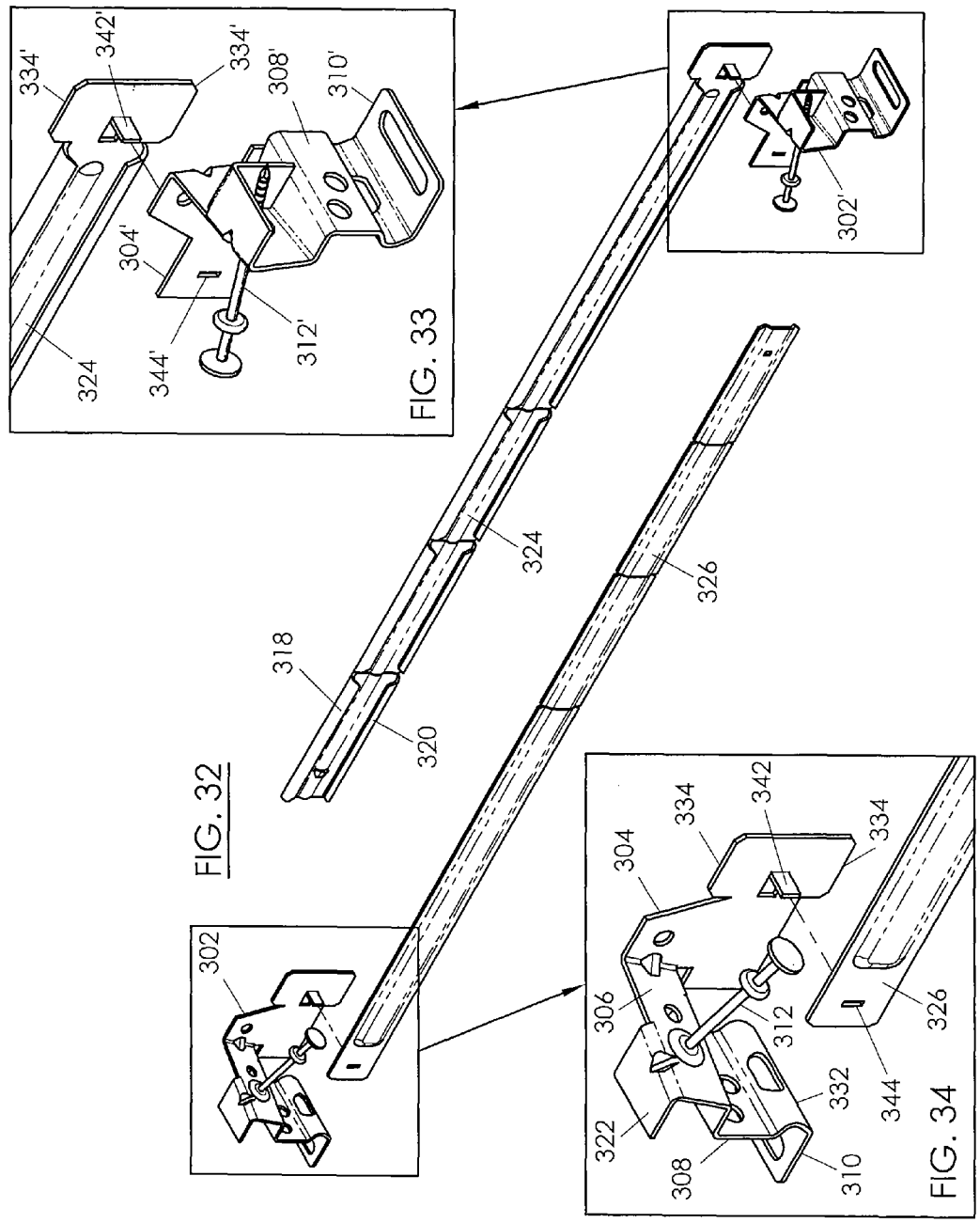

SECTION B-B

SECTION A-A

HANGER BAR FOR RECESSED LIGHTING FIXTURES

CROSS-REFERENCE TO RELATED APPLICATIONS

This application is a continuation-in-part (CIP) of co-pending parent application having U.S. application Ser. No. 12/045,604, filed Mar. 10, 2008, which application claims priority from U.S. Provisional Application No. 60/894,416, filed Mar. 12, 2007, all of whose contents are hereby incorporated by reference.

BACKGROUND

Recessed lighting fixtures are commonplace in residential homes and commercial buildings. A recessed lighting fixture typically has a metal housing or can, an electrical junction box, and a conical-shaped recessed trim piece to direct and reflect the lighting emitted by a bulb that is in a bulb holder or socket. The recessed lighting can is installed above the ceiling in a building or house so that the opening in the can and trim are flush with the ceiling. The light is recessed into the ceiling.

The can with a junction box and other hardware are suspended by a pair of hanger bars extending parallel and on opposite sides of the assembly. The hanger bar is typically stamped from steel and is length-adjustable by a telescopic action. The opposite ends of the hanger bar, which resemble ears, are configured to attach to the ceiling support structure.

Specifically, one type of standard ceiling is supported by joists, and the recessed lighting fixture is mounted onto the joists via the hanger bars. When the joists are made of wood or concrete, for example, the hanger bars are usually mounted to the joists with nails, screws or other standard mounting means. The weight of the light fixture is thereby supported by the joists through the hanger bars.

Alternatively, the ceiling may be of the "drop down" or suspended type. A drop down ceiling is a secondary ceiling often formed to conceal piping, wiring, HVAC, and/or the floor above. The drop down ceiling typically consists of a grid-work of metal channels in the shape of an upside-down "T," suspended on wires from an overhead structure. The channels snap together in a regularly spaced pattern, and the resulting cells are filled with lightweight "acoustic ceiling tiles" or "panels" dropped into the grid. Light fixtures may be installed into the grid as desired.

The hanger bars of light fixtures sometimes include a clamp or adapter formed into the hanger bar to attach to the T-bars of a drop down ceiling. These clamps or adapters are sometimes an unnecessary appendage. For example, when installing a light fixture onto a joist of a standard ceiling rather than onto a drop down ceiling, the installer may choose to use a nail or other fastener to secure the assembly in place on the joist. The clamps or adapters are then unnecessary and may even get in the way during installation. Since they are formed as part of the hanger bar, they cannot be removed or detached.

SUMMARY OF THE INVENTION

The present invention is directed to a hanger bar used to support a recessed lighting fixture or assembly.

In one embodiment of the invention, a hanger bar assembly for recessed lighting fixtures has a first bar that has a channel. A second bar is disposed within the channel, and the second bar moves within the channel for a telescoping action. There is a first bracket on an end of the first bar, and a second bracket on an end of the second bar. A first spring clip is detachably coupled to the first bracket, and a second spring clip is detachably coupled to the second bracket. Each of the first and second clips has a pair of downwardly extending arms. A first leg extends from the first spring arm, a second leg extends from the second spring arm, and a foot extends outwardly from the second leg. The clip also has a third arm for removably attaching the clip to a respective bracket. Each of the brackets has a nail holder and a nail extending through the nail holder. The nail holder may be an opening in the bracket.

The nails may each extend at an angle relative to the first and second bars so that the nail shaft is angled away from the hanger bars, or downward below the hanger bars, or both. By angling the nail away from the hanger bar, it is easier for the installer to use a hammer to drive the nail and avoid accidental impacts with the relatively thin sheet metal of the hanger bar. The downward slope of the nail permits easier hammer blows since the electrician typically stands below the height of the light fixture assembly, which is situated at or above head level during installation.

Each of the brackets may include an ear and an arm extending at an angle to the ear. The brackets may include a shelf attached to the arm. Each shelf may have a depression or an opening to receive a clip, and the clips may attach to a respective shelf. The spring clips are thus a discrete component that may be easily detached from the hanger bar by the user in the field. The clips are used to mount the hanger bar to T-bars of a drop down ceiling.

In one embodiment, there is a nail opening in each bracket arm. A nail extends through each nail opening. Each bracket arm is angled upwardly, such that the nails each extend at an upward angle relative to the first and second bars. In another embodiment, there is a nail opening in each bracket arm, a nail extends through each opening, and each bracket arm extends at an obtuse angle greater than 90 degrees relative to its respective ear, such that the nails extend outwardly relative to the bars.

The bracket may include a nail holding surface and at least one front panel spaced a distance from the nail holding surface. The front panel extends in a direction approximately perpendicular to the bars, the nail holding surface extending at an angle relative to the front panel.

The spring clips may be made from a variety of materials, such as spring steel, a very tough or elastic polymer, or from other materials known in the art that are suitable for clips. Each clip may be made of a single strip of spring steel, for example. In one embodiment, the clip and the hanger bar are made of different materials.

In a preferred embodiment spring clip, the foot has a length, and the foot may have an opening for a nail or other fastener. In one embodiment, the opening extends along most of the length of the foot. This opening may be used, for example, to nail or screw the clip to the underside of a joist. In one embodiment, the clip has an upper portion that is generally U-shaped, and a lower portion in which the first and second arms bend toward one another to form a neck. The first and second legs may extend from the respective first and second arms at the neck and curl away from each other to form a wide mouth.

The clips may have a top in between the first arm and the second arm, and a third arm for removably attaching the clip to a respective bracket may extend from the top of the clip. The third arm may include an indentation for engaging with one of a depression and an opening in the shelf.

In one embodiment, at least one of the ears is spaced from a respective bar to form a jog. One or both of the hanger bars may include a stop at an end, to limit the range of motion of the other hanger bar. The channel may be formed with at least one of a folded and a curled edge.

According to another embodiment of the invention, a hanger bar assembly for recessed lighting fixtures has a first bar having at least one of a folded and a curled edge forming a channel. A second bar is disposed within the channel, such that the second bar moves within the channel for a telescoping action. The first bar includes a first bracket on an end of the first bar, and a second bracket that may be on an end of the second bar. A first spring clip is detachably coupled to the first bracket. A second spring clip is detachably coupled to the second bracket. Each of the first and second clips have a pair of downwardly extending arms, a first leg extending from the first spring arm, a second leg extending from the second spring arm, an outwardly-extending foot on the second leg, and a third arm for removably attaching the clip to a respective bracket. Each of the brackets have a nail holder and a nail extending through the nail holder. The nails each extend at an outward angle relative to the first and second bars. Each of the brackets includes an ear and an arm extending at an angle to the ear, and a shelf attached to the arm. The clips attach to the respective shelves. The bracket includes a nail holding surface and at least one front panel spaced a distance from the nail holding surface, the front panel extending substantially perpendicular to the bars, the nail holding surface extending at an angle relative to the front panel, which angles the nail away from the hanger bar.

The foregoing and other objects and advantages of this invention will be apparent from the following more detailed description when taken in conjunction with the accompanying drawings of exemplary embodiments.

BRIEF DESCRIPTION OF THE DRAWINGS

FIG. 19 is a perspective view of an alternative embodiment hanger bar;

FIG. 20 is a perspective view of an alternative embodiment ear portion different than the ear portion shown in FIG. 19;

FIG. 21 is a top plan view of an ear portion of the hanger bar from FIG. 19;

FIG. 22 is a side elevational view of the ear portion of FIG. 21;

FIG. 23 is an exploded perspective view of the hanger bar from FIG. 19;

FIG. 24 is a detailed perspective view of an ear portion at one end of the hanger bar of FIG. 23;

FIG. 25 is a detailed perspective view of an ear portion at the opposite end of the hanger bar of FIG. 23;

FIG. 26 is a detailed view of one end of the hanger bar from FIG. 19;

FIG. 27 is a cross-sectional view, enlarged in scale for clarity, of the same end as FIG. 26 taken along line A-A of FIG. 26;

FIG. 28 is a perspective view of another alternative embodiment hanger bar;

FIG. 29 is a perspective view of an alternative embodiment ear portion different from the ear portion shown in FIG. 28;

FIG. 30 is a top plan view of an ear portion of the hanger bar from FIG. 28;

FIG. 31 is a side elevational view of the ear portion of FIG. 30;

FIG. 32 is an exploded perspective view of the hanger bar from FIG. 28;

FIG. 33 shows the assembly of an ear portion to one end of the hanger bar of FIG. 32;

FIG. 34 shows the assembly of an ear portion to the opposite end of the hanger bar of FIG. 32;

DETAILED DESCRIPTION OF THE PREFERRED EMBODIMENTS

Figure 1:
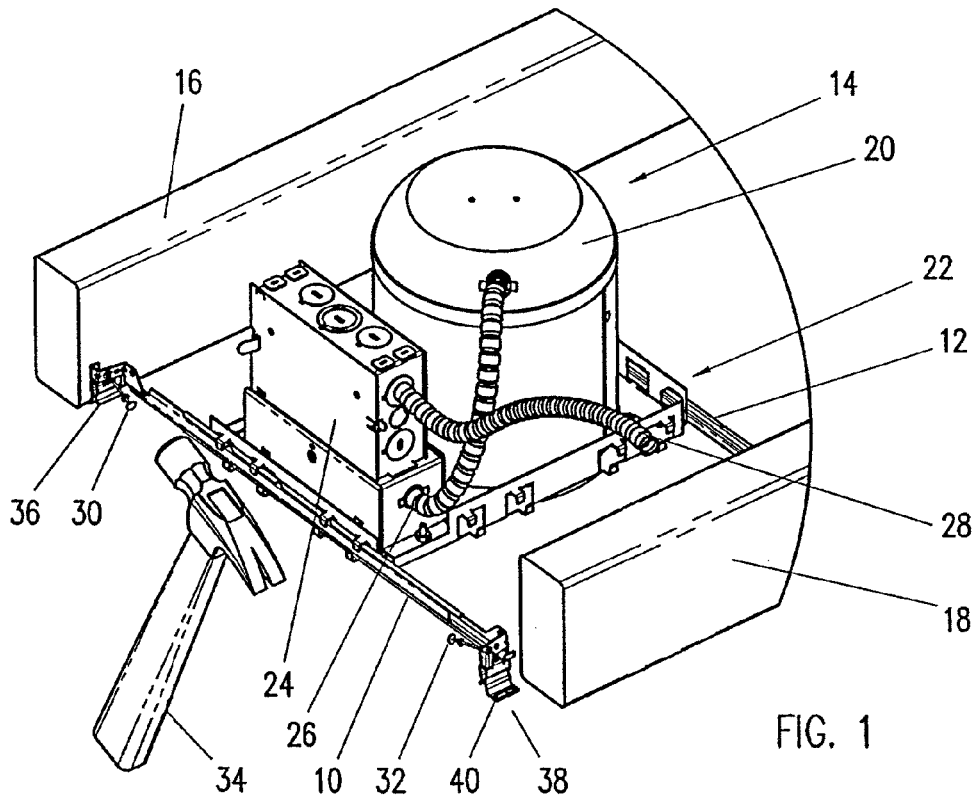
FIG. 1 is a perspective view of a preferred embodiment of the present invention hanger bars as used with a recessed lighting fixture in conjunction with ceiling joists.

FIG. 1 is a perspective view of a preferred embodiment of hanger bars 10, 12 used with a recessed lighting fixture 14 in conjunction with a ceiling that has ceiling joists 16, 18. The fixture includes a cylindrical housing or can 20 supported on a rectangular frame 22. Also resting on the frame 22 is a junction box 24 and conduits 26, 28 for receiving A/C power input and for providing power to a bulb holder and trim (not shown) that are held inside the can 20.

The fixture 14 is supported on both sides by the preferred embodiment hanger bars 10, 12. When the recessed lighting fixture 14 is being secured to a ceiling having wood ceiling joists such as 16, 18, it is preferred that the hanger bars 10, 12 be nailed to the respective ceiling joists. Consequently, nails such as 30, 32 are provided at each end of the hanger bars 10, 12. An electrician or installer may then hammer the nails 30, 32 into the joists using a hammer 34 illustrated in FIG. 1. Also at the ends of each hanger bar are spring clips 36, 38 that may be used to additionally secure the hanger bars to the ceiling joists. In particular, each clip 36, 38 includes a foot having an opening 40 through which a nail, screw or other fastener (not shown) may secure the clip to the underside of the respective ceiling joist. The particular geometry and construction of the respective clips 36, 38 will be discussed in more detail below.

Figure 2:
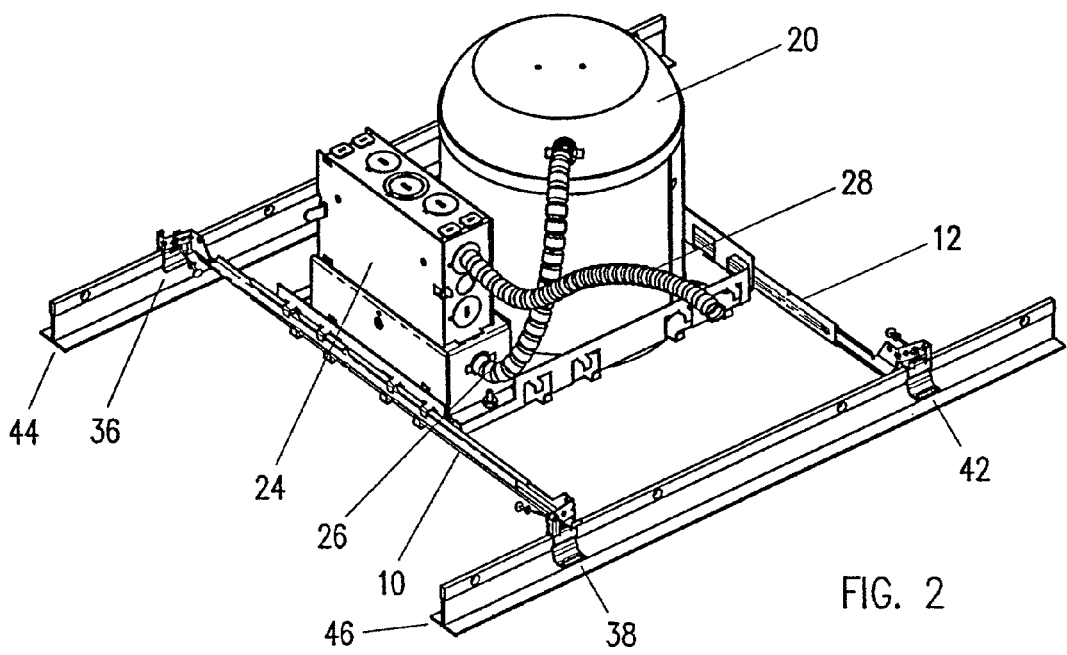
FIG. 2 is a perspective view of a preferred embodiment of the hanger bars as used with a recessed lighting fixture in conjunction with T-bars, thin rails, wires or cross-members.
Figure 3:
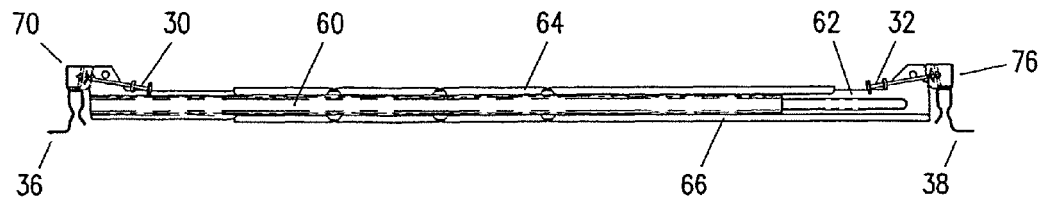
FIG. 3 is a front elevational view of a hanger bar according to the present invention which is constructed from two discrete bars or rails that telescope relative to one another.

FIG. 2 is a perspective view of the recessed lighting fixture 14 as mounted on T-bars 44, 46 of a drop-down ceiling. The clips 36, 38 and 42, as well as a fourth clip (not shown), snap with pinching pressure onto the respective horizontal T-bars. In this scenario, the hanger bars do not need to be hammered into place on joists, as no nail is needed to secure the hanger bars to the horizontal T-bars 44, 46.

As can be seen by comparing FIGS. 1 and 2, the hanger bars 10, 12 are versatile in that they may be secured to ceiling joists and/or to members of a drop down ceiling such as, for example, horizontal T-bars 44 and 46 of FIG. 2. The clips 36, 38 serve primarily to secure the hanger bars to members of the drop down ceiling. But as seen in FIG. 1, the respective clips each has a foot extending outwardly that may be nailed or otherwise secured to the underside of respective ceiling joists.

Figure 5:
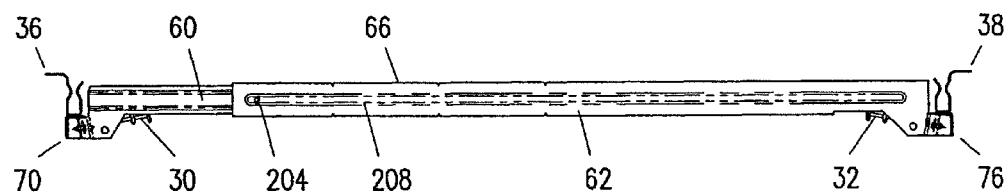
FIG. 5 is a rear elevational view of the hanger bar of FIG. 3.
Figure 6:
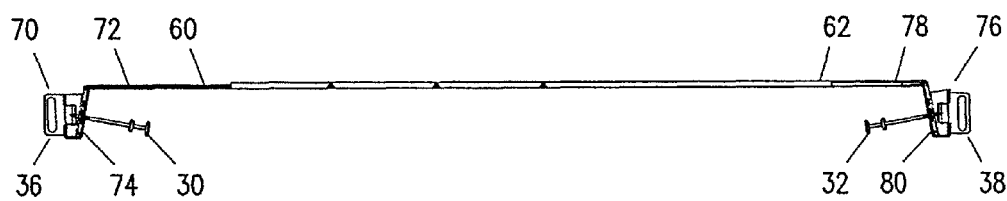
FIG. 6 is a top plan view of the hanger bar of FIG. 3.
Figure 7:
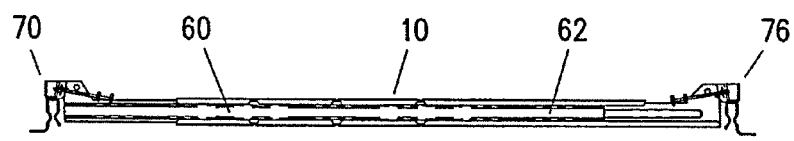
FIG. 7 shows the hanger bar in a contracted configuration.
Figure 8:
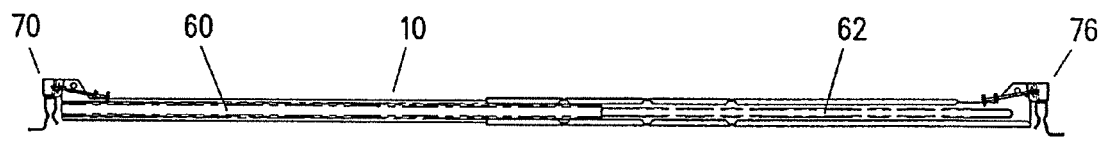
FIG. 8 shows the hanger bar in an expanded configuration.

Considering now the construction of a preferred embodiment hanger bar, and referring to FIGS. 3-6, a hanger bar 10 such as shown in FIG. 1 preferably has bars 60 and 62 that are slidably interconnected with one another. The bar 62 has folded or curled edges 64, 66 that create a channel through which the complementary bar 60 may slide. In this way, a telescoping bar assembly is constructed. This enables the user to adjust the length of the overall bar assembly, depending on the spacing of the horizontal T-bars, such as 44 and 46 of FIG. 2, or of the spacing of ceiling joists 16, 18, as the case may require. FIG. 7 illustrates a hanger bar 10 in a contracted configuration, while FIG. 8 illustrates the same hanger bar 10 in a more expanded configuration. In this way, the hanger bar is adjustable to a desired length by the installer in the field.

Returning to FIGS. 3-6, nails or other fasteners 30, 32 extend through a respective bracket assembly or ears 70, 76. Typically the nails 30, 32 in the preferred embodiment are angled upwardly from the nail head (FIG. 3) and outwardly (FIGS. 4 and 6) relative to the length of the bars 60, 62. This angling of the nail or fastener facilitates the construction worker, electrician, or installer by allowing him or her room to hammer the nail without inadvertently hitting the thin, sheet-metal bar with the hammer head. The angling of the nail also results in more secure fixation of the respective bars to the respective joists, because the nail penetrates into the joist along an axis that is not parallel to the long axis of the hanger bar. With an angled nail, the weight of the light fixture bearing down on the hanger bars will be less prone to cause the nail to back out. It is noted, however, that the nails or other standard types of fasteners 30, 32 need not be used when the lighting assembly is affixed to T-bars 44, 46 of a drop down ceiling, as illustrated in FIG. 2, for example.

When a nail 30, 32 is used as the fastener, it is typically held in place on the bracket 70, 76 by friction fit. The nails may include a round, flange-like stop a slight distance from the flat head so that the nail can only be driven a predetermined distance into the ceiling joist. The tip or point of the nail when the nail is driven by hammer blow on its flat head passes completely through the hanger bar and into the ceiling joist. Small circumferential ribs may optionally be included near the tip for better gripping of the nail to the wood joist.

In FIG. 5, the back side of bar 62 is shown to have an optional crease or indentation 208 to improve stiffness or rigidity of the bar 62. An indentation or bump 204 may be provided to interfere with a matching indent 206 (not shown) on bar 60 to prevent the bars 60, 62 from disengaging when the bars are fully extended.

Figure 4:
FIG. 4 is a bottom plan view of the hanger bar of FIG. 3.
Figure 9:
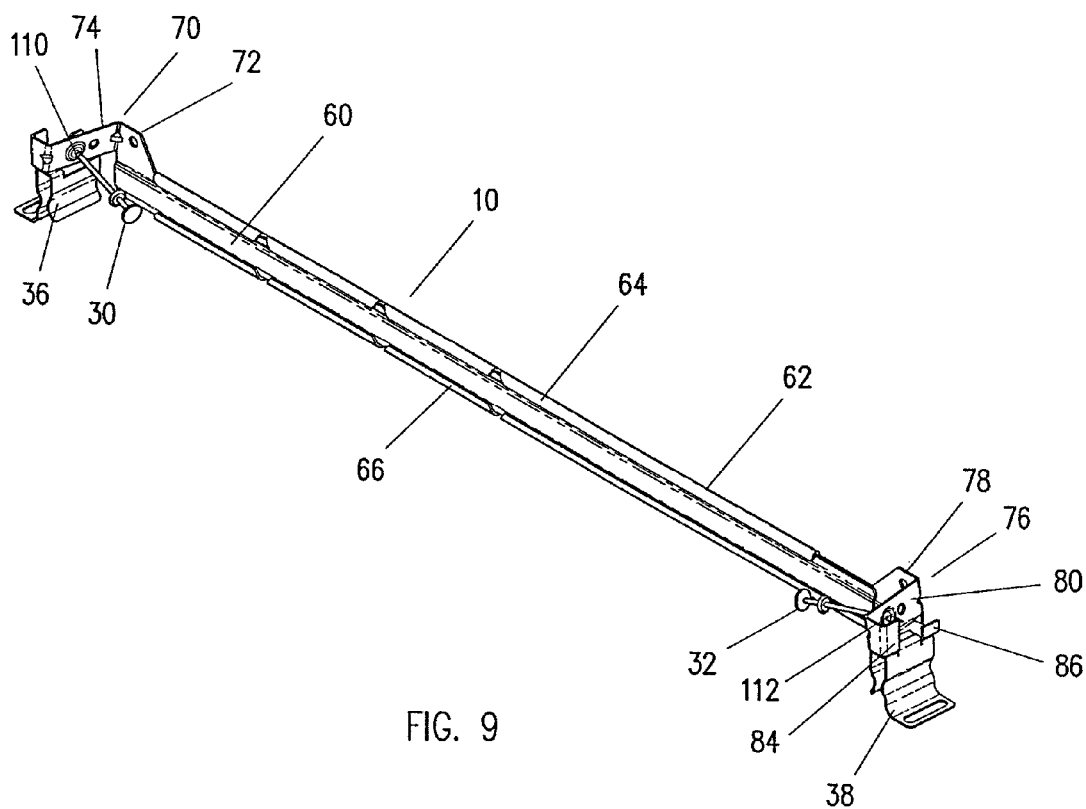
FIG. 9 is a perspective view of a hanger bar according to the present invention from the top perspective.
Figure 10:
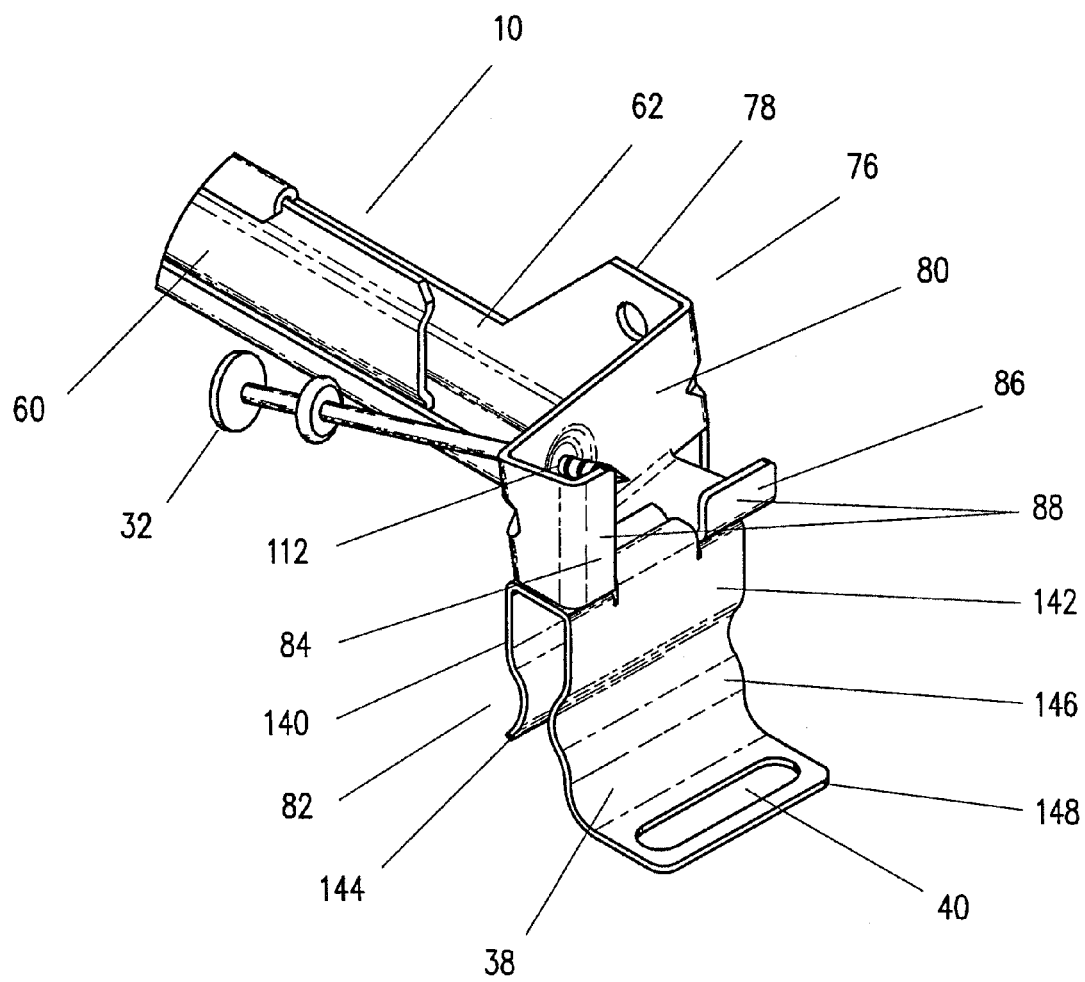
FIG. 10 is a detailed perspective view of a bracket and clip assembly.
Figure 11:
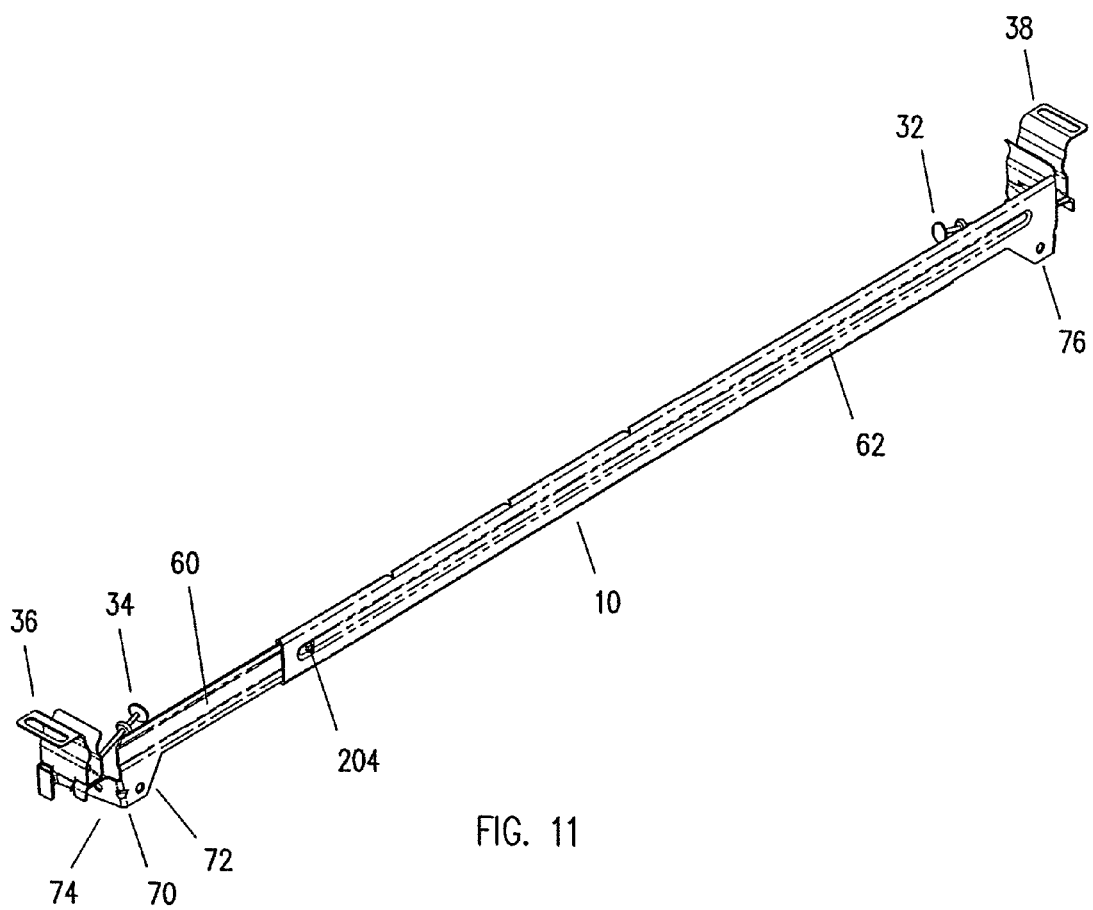
FIG. 11 is a detailed perspective view of the hanger bar.
Figure 12:
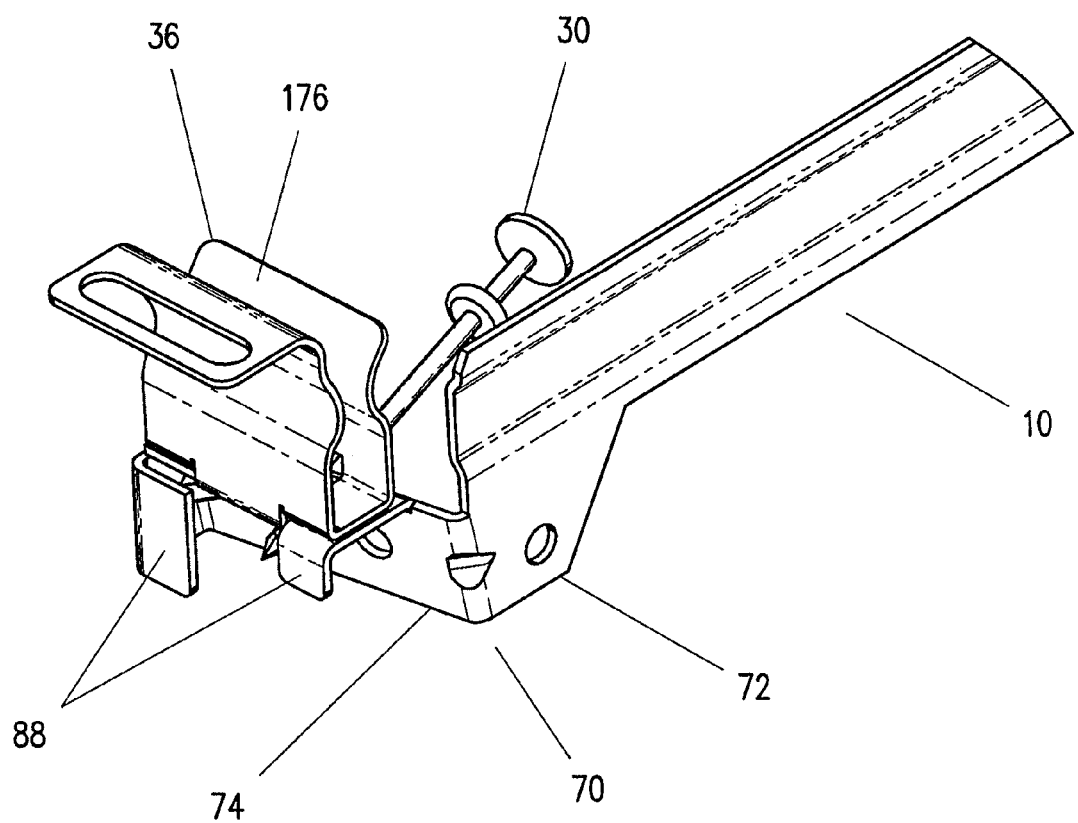
FIG. 12 is a detailed perspective view of a bracket and clip assembly.

FIG. 9 is a top, perspective view of the hanger bar 10 according to the present invention. FIG. 10 in a perspective view illustrates in greater detail the clip and bracket assembly. FIG. 11 is a perspective view of the bottom of the hanger bar 10, and FIG. 12 is a detailed view of the clip and bracket assembly. Each bracket 70, 76 has first ear portions 72, 78 and arm portions 74, 80. Each arm 74, 80 defines a theoretical plane that is generally at an obtuse angle (greater than) 90° relative to the theoretical plane defined by each first ear portion 72, 78. This obtuse angle can be best seen in the bottom and top plan views of FIGS. 4 and 6, respectively. The arms 74, 80 include nail apertures 110, 112 through which respective nails 30, 32 extend. Since each nail 30, 32 passes through the respective arms 74, 80 that are angled relative to first ear portions 72, 78, which ear portions are generally parallel to each bar 60, 62, the obtuse angle causes each nail 30, 32 to be likewise angled away from the bar 60, 62. That is, since each nail 30, 32 has a flattened head at one end and a sharp point at the other, the flat head is positioned farther away from the bar 60, 62 than its point. Again, this is best seen in FIGS. 4 and 6.

Considering FIG. 10, a spring clip 38 having a generally U-shaped upper portion 82 is removably attached to the arm 80. The clip 38 is preferably made from a high strength spring steel to enable a clamping or pinching action. It is bent into its compound curved U-shape. The pinching action allows the clip 38 to snap over and grip the T-shape cross-section of the T-bar 44, 46 securely.

The clip 38 includes a first spring arm 140, a second spring arm 142, a first leg 144, and a second leg 146. A foot 148 extends outwardly from the second leg 146. The foot 148 includes an elongated aperture 40 through which a nail or other securing member can extend. The bracket 76 also includes bumper portions 84 and 86 which extend atop the detachable and removable clip 38 when the clip 38 is secured into place on the bracket 76. These bumper portions 84 and 86 help retain the clip 38 in place on the assembly. Furthermore, the front surfaces of bumper portions 84, 86 collectively form a front panel 88 that is typically perpendicular to the plane of the bars 60, 62, and the front panel 88 bumps and squarely engages with the flat side of the ceiling joist 16, 18.

Referring again to FIG. 10, the planes represented at the ends of the hanger bars are not parallel. Specifically, front panel 88 defines a plane generally containing the faces of bumper portions 84 and 86, which plane is generally perpendicular to the lengths of the bars 60, 62. Another plane containing the arm 80 is angled and not parallel to the plane containing the front panel 88. Since the aperture 112 receiving the nail 32 is formed on a surface in the angled arm 80, the nail 32 is likewise angled. As a result, the angling of the nail 32 is such that its flat head extends away from the bar 62. This angling of the nail allows the installer to hit the nail squarely with a hammer without accidentally striking the bar 62 in the same motion, because there is more room between the nail and the bar. This is in contrast to a nail that is oriented parallel to the bar.

Furthermore, the nail 32 as seen in FIG. 10 is preferably angled so that the flat nail head is oriented downward, or the pointed end is directed upward. If the first and second bars 60, 62, fall within a theoretical level, horizontal plane, then the nail is angled so that its flat head is lower than the plane and its pointed end is at or above the horizontal plane. The downward angling of the nail 32 enables the installer, who has the entire recessed lighting assembly situated at head level or above, to more easily strike at the nail head with his hammer from his position below. If the nail were parallel with the hanger bars or level with the horizontal plane, the installer standing from below the nail may not be able to strike the nail squarely on the head.

Figure 13:
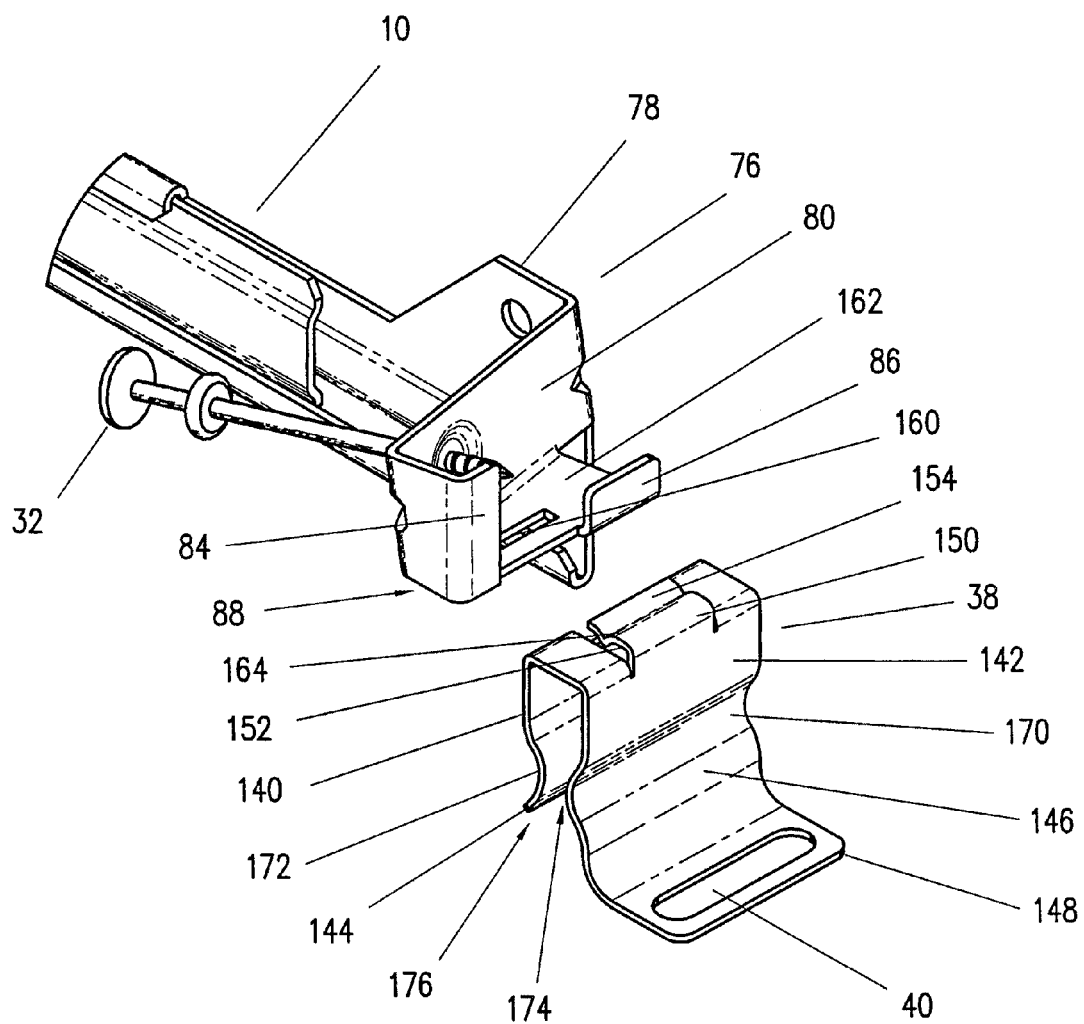
FIG. 13 is a detailed view of the bracket and clip assembly from the top perspective with the clip removed.
Figure 14:
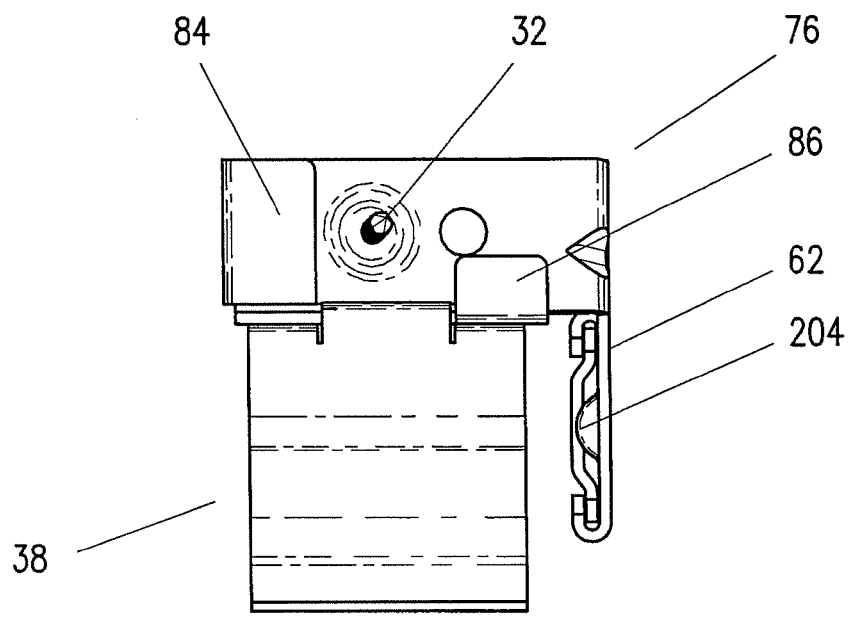
FIG. 14 is a right end view of the hanger bar of FIG. 9.
Figure 15:
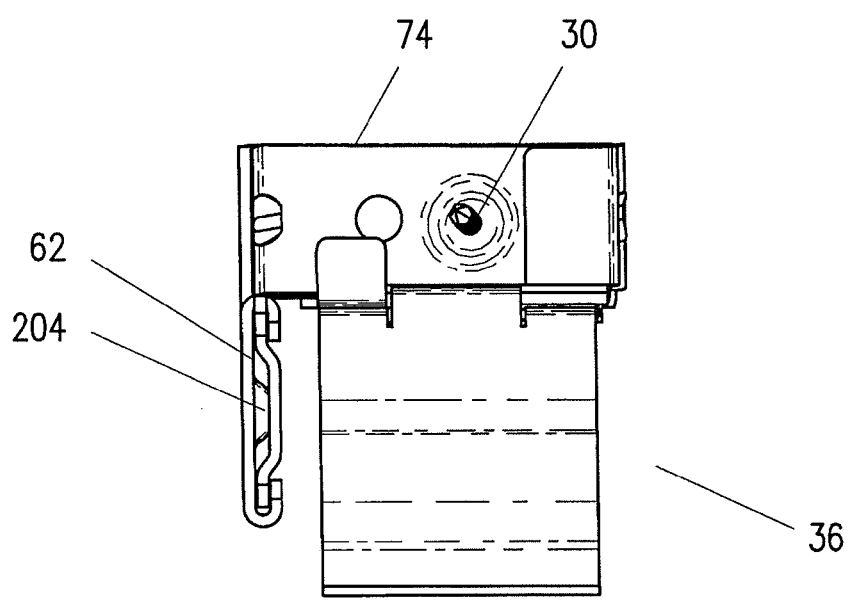
FIG. 15 is a left end view of the hanger bar of FIG. 9.

FIG. 13 is the assembly of FIG. 10 with the clip 38 removed by the end user or installer in the field. To make the clip 38 detachable, a third spring arm 150 is provided atop the clip 38. A space 152 is defined between the third arm 150 and the main body of the clip 38. The third arm 150 may optionally include a leg 154 that aids in attaching the clip 38 to the bracket 76. The bracket 76 may include an engagement portion 160 such as an opening in a horizontal shelf 162. In the embodiment of FIG. 13, the clip 38 may be snapped into place on the shelf 162 by sliding the third arm 150 of the clip 38 forward such that the ridge 164 engages in the opening 160 of the bracket assembly. The opening 160 may alternatively be a depression rather than a full opening. A tight friction/pressure contact keeps the clip 38 joined to the bracket 76.

As the third arm 150 is a spring arm, the arm serves to lock the clip 38 into place on the hanger bar 10 when desired. In the field, the installer or electrician can remove the clip 38 when desired. To remove the clip, the ridge 164 is disengaged from the opening or depression 160 of the ear assembly, and the clip may the be pulled free from the hanger bar with use of a pliers.

It is noted that the first arm 140 and the second arm 142 are spring arms. They are preferably formed in such a way that they curve inwardly toward one another at a region 170, 172. The legs 144, 146 curve outwardly so as to form a neck or relatively narrow portion 174 in the clip. When this neck 174 is forced open, as when the clip is pushed down onto a horizontal T-bar, such as T-bar 46 as FIG. 2, the neck 174 is forced open and the resilience in the spring arms 140 and 142 urge the arms to clamp down on the T-bar 46. This secures the hanger bar 10 to the T-bar 46, thereby mounting the recessed lighting fixture 14 onto the horizontal T-bars. The distal outward curl of arms 140, 142 forms a wide mouth 176 that facilitates the installer to more easily align and push the clip onto the T-bar. Oftentimes, the installer's head is situated below the T-grid, so attaching the clips to the T-grid is performed overhead, above eye level and by feel, so the wide mouth 176 simplifies this task for the installer. If for any reason, perhaps due to space constraints in a ceiling area, the clips 36, 38 are not needed, the installer simply pops them off of the hanger bar 10, 12.

Figure 16:
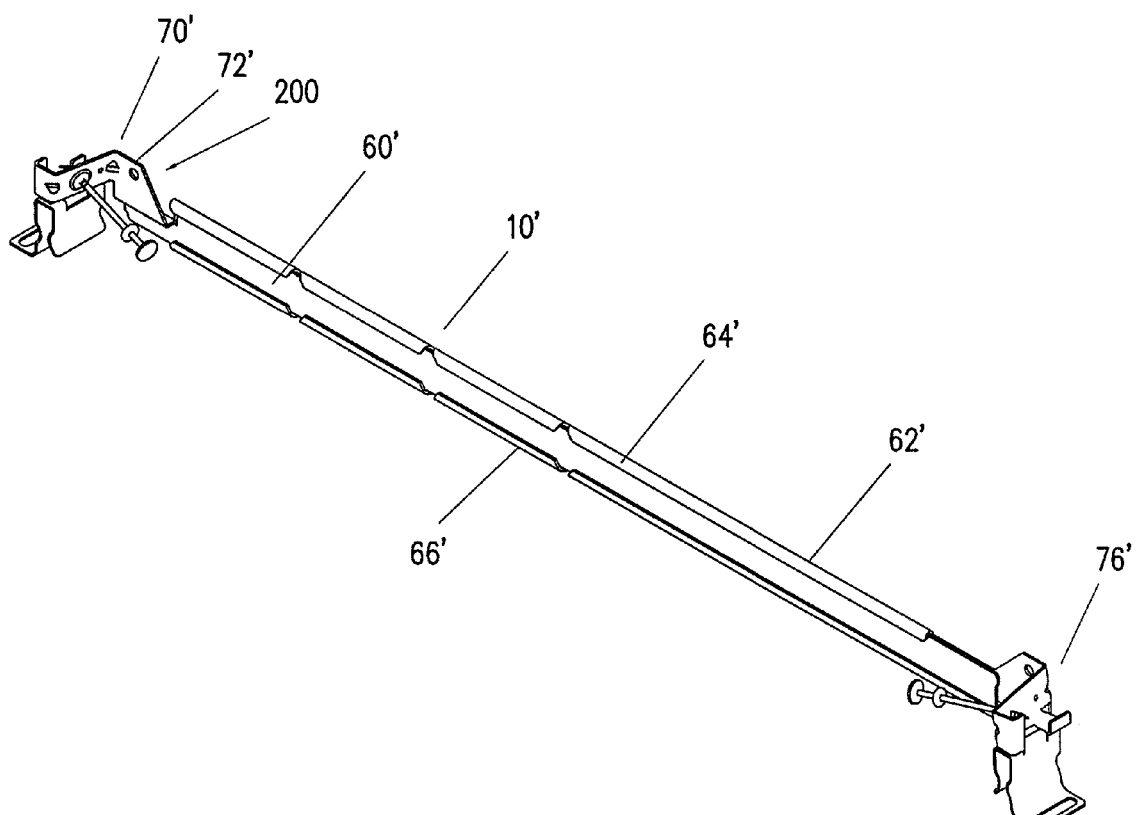
FIG. 16 is an alternative embodiment hanger bar having one ear with a jog that moves the ear away from a co-planar arrangement to the rail to a parallel relationship to the rail.

In the above-described embodiments, the non-bracket end of one bar cannot slide past the bracket end of the other bar when the two bars are contracted toward the shortest overall length. As seen in FIG. 9, this occurs because the curved edges 64, 66 of one bar 62 bump into the ear 72 of the other bar 60 and can move no farther, thus limiting the lengthwise contraction of the entire hanger bar. On the other hand, FIG. 16 illustrates an alternative embodiment of a hanger bar 10' having a modified ear as part of a bracket on one end of one bar. In the embodiment of FIG. 16, one ear 72' has jog 200 that moves the ear away from its coplanar arrangement with the hanger bar 10' to be parallel with it. This jog 200 in FIG. 16, which spaces the ear somewhat from the bar 60', provides a gap for the curved edges 64', 66' at the non-bracket end of the other bar 62' to slide past ear 72' of the bar 60'. This is sometimes known in the industry as a "pass-through" feature.

Figure 17:
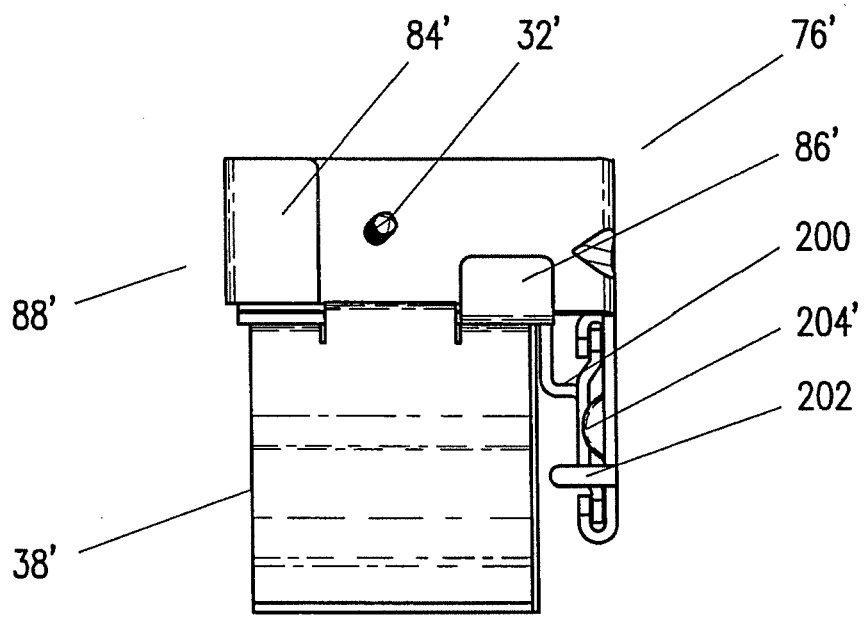
FIG. 17 is a right end view of the hanger bar of FIG. 16.
Figure 18:
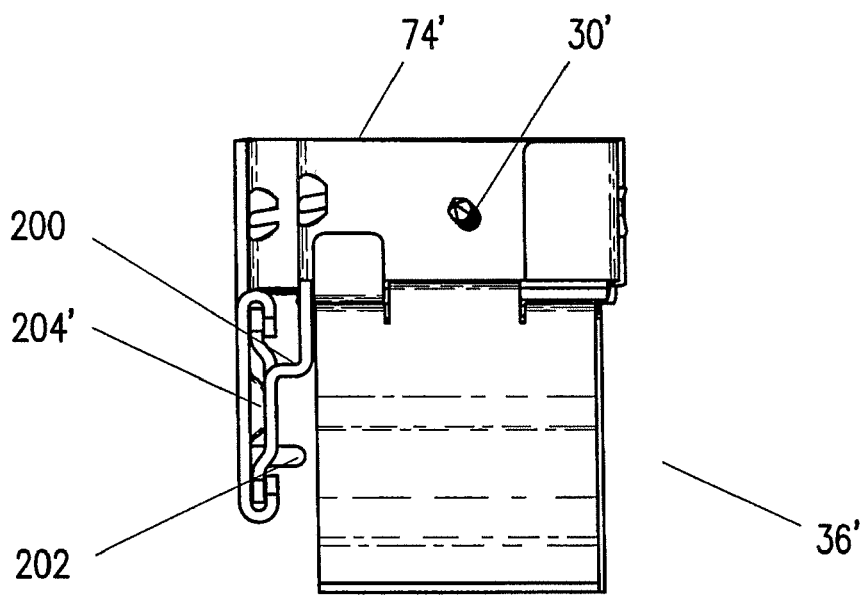
FIG. 18 is a left end view of the hanger bar of FIG. 16.

It is desirable in the alternative embodiment of FIGS. 16-18 to provide other means to disable the pass-through feature, i.e., to prevent the non-bracket end of bar 62' from sliding past the bracket 70' of the other bar 60'. Hence, FIGS. 17 and 18 illustrate an optional stop 202 which, in this case, is a small bent metal finger that blocks the non-bracket end of the bar 60' from sliding forward. Thus, the stop 202 prevents the non-bracket end of the bar 60' from extending past the bracket 76' as the bars 60', 62' are contracted. To act as a stop when the bars are telescoped outwardly, an optional protrusion or indentation 204 may be provided on bar 60', with a second protrusion or indentation (not shown) provided on bar 62'. As the bars are telescoped outwardly, the protrusions interfere with one another to prevent bar 60' from sliding out of the channel and disassembling, and thereby limiting the range of motion of the bars relative to one another.

FIG. 19 is a perspective view of an alternative embodiment hanger bar 300. As in the other embodiments, the hanger bar 300 has a straight bar 326 component that slides into a second straight bar 324 wherein the latter has folded over edges to form a channel. When the two bars 326, 324 are slidably engaged as shown, the hanger bar 300 is extendable in length via its telescoping function. The two ends of the hanger bar 300 are mirror images. At one end of the hanger bar 300, and attached to one end of the straight bar 326 is a polygonal shape, here a pentagon, ear portion 304.

The ear portion 304 is preferably a polygonal shaped, flat plane of material that is discrete and separate from the straight bar 326. The ear portion 304 is joined to the end of the straight bar 326 via joint 328. The structure and function of this joint are described in greater detail below. The ear portion 304 falls within a theoretical plane parallel to the plane defined by the straight bar 326.

At the distal edge of the ear portion 304 is a bend that transitions into an arm 306. A plane containing the arm 306 is not at a right angle relative to a plane defined by the straight bar 326, as depicted in the top plan view of FIG. 21. That is, angle A is not 90 degrees but rather a skewed and more precisely an obtuse angle. This skewed angle orients the nail 312 so that its shaft and head 314 extend away from bars 324, 326. As mentioned earlier and depicted in FIG. 1, this enables the installer, electrician, or carpenter easier hammer access to the nail head 314 without inadvertently striking the bar 324, 326, which would damage the bars typically made of thin sheet metal. In the preferred embodiment, the nail 312 as seen in FIG. 21 is angled about 10.2 degrees away from the bars 324, 326.

FIG. 22 is a side elevational view of the same end of the hanger bar 300 depicted in FIG. 21. In this preferred embodiment, the nail 312 is angled downward from the horizontal about 10 degrees. The nail 312 angled as such places the nail head 314 for easy hammer strikes because installation of the hanger bar 300 takes places above shoulder level of the installer when he or she is standing on a stepladder. Therefore, the installer can more easily strike the downward facing nail head 314 with the hammer. When there are numerous recessed lighting fixtures to be installed, and each fixture requires a pair of hanger bars, angling the nail head 314 toward the installer saves the installer tremendous labor and time, and further minimizes inadvertent damage to the hanger bar from an errant hammer blow, which wastes time and material. From empirical studies of the dimensions of the nail, ceiling joist spacing, hanger bar dimensions, ergonomics, with given clearance spaces in such installation sites in ceilings, it has been found that in FIG. 22 where the nail 312 is angled away from the bars 324, 326 about 10.2°±3° is preferable. Likewise, in FIG. 22, it has been found that the nail 312 angled downward from the horizontal at about 10°±3° is preferable.

FIG. 20 is an isolated perspective view of the opposite end of the hanger bar 300 shown in FIG. 19, wherein in this alternative embodiment ear portion 304', the shelf 322' is a flat plane extending across the width of the bumper portion 308'. In contrast, the preferred shelf in the ear portion of FIG. 19 has been bent over 90 degrees partially circumscribing the pointed end of the nail 312'. In the FIG. 19 ear portion embodiment with a 90-degree-bent-shelf, the rigidity and resistance to distortion in the bent sheet metal of the area surrounding the nail 312' are improved. The 90-degree bend in the sheet metal is similar to placing a rigid angle iron adjacent to the nail 312'. Due to this rigidity, during installation of the hanger bar, any errant hammer blow that misses the nail head 314' and strikes the ear portion 304' will less likely distort the ear portion or shelf when it is forced into the ceiling joist. If the bumper portion or shelf are bent or distorted, the hanger bar will not butt up and install squarely against the ceiling joist.

Other than the unbent shelf 322', the FIG. 20 ear portion is the same as the ear portion shown in FIG. 19. In FIG. 20, the bracket 302' is attached via joint 328' to the end of channel bar 324. Bracket 302' includes a polygonal shaped ear portion 304' with an arm portion 306 bent not quite at a right angle relative to the bars 324, 326. As with the other end, the ear portion 304' is a separate piece that is discrete from the channel bar 324, and is subsequently affixed thereto via joint 328'.

One benefit of having a bracket and its components being made separate from the hanger bar is the cost and complications of manufacture. The hanger bar and bracket are all preferably made from steel sheet metal. As seen in the drawings, with the number of folds, planes, non-perpendicular angles, etc., the bracket is very expensive to fabricate and involves complicated stamping, punching, and metal forming steps. To have the bracket made from the same piece of sheet metal as the bar portion exacerbates the manufacturing complications and number of fabrication steps, and scrap generated. Therefore, it is greatly advantageous to have the bracket made separate from the bar and to then join the two parts together at a later stage of fabrication.

Each bracket 302, 302' has a shelf 322, 322' and bumper 308, 308'. The edge of the shelf 322, 322' and the flat face of the bumper 308, 308' are perpendicular to the bars 324, 326 as best seen in the plan view of FIG. 21. The edge of the shelf 322, 322' and the face of the bumper 308, 308' together help quickly and easily square the ends of the hanger bar 300 against the sides of the ceiling joists 16, 18 during installation, shown in FIG. 1. The bumper 308, 308' transitions into a foot 310, 310' that defines a plane parallel to the horizontal. As discussed previously, the foot 310, 310' is used to attach the bracket 302, 302' to the bottom edge of the ceiling joists 16, 18 as in FIG. 1.

The polygonal ear portion 304, 304' as best seen in the side elevational view of FIG. 22 includes a leading edge 330 and the back side of the bumper 308, 308' includes a curved pincher 332. With these optional structures, if the hanger bar 300 is used in conjunction with T-bars 44, 46 of a drop-down ceiling shown in FIG. 2, the T-bar 44, 46 fits within the space between the leading edge 330 and the curved pincher. In FIG. 22, in a hypothetical sense, a T-bar would extend perpendicularly out of the paper, passing through the gap between leading edge 330 and curved pincher 332. Because the bumper 308, curved pincher 332, and foot 310 extend in a cantilevered fashion as seen in FIG. 22, there is resilience in these structures and specifically in curved pincher 332 so that it is biased to close into the gap. Accordingly, the bump in the curved ridge 332 bends slightly and can snap back toward leading edge 330 thus clamping against a ridge typically found along the top of a T-bar 44, 46. The T-bar 44, 46 is thus securely held in the gap between the leading edge 330 and the inward bias of the curved pincher 332.

FIG. 23 is an exploded perspective view of the hanger bar 300 from FIG. 19. That hanger bar 300 is made from the straight bar 326, the channel bar 324, and two brackets 302, 302' at opposite ends. The brackets 302, 302' are affixed to the respective ends of bars 326, 324 as shown in the enlarged detail views of FIGS. 24 and 25.

FIG. 26 is a detailed view of one end of the hanger bar 300 from FIG. 19. FIG. 27 is a cross-sectional view, enlarged in scale for clarity, of that end taken along line A-A of FIG. 26 to better show the joint 328'. As seen in FIG. 26, the ear portion 304' is joined to the very distal end of channel bar 324. The folded over edges 334' of channel bar 324 "grip" the end of the ear portion 304' preventing it from rotating. The joint 328' prevents the ear portion 304' from sliding out of the grip and detaching from the channel bar 324.

As best seen in the cross-sectional view of FIG. 27, the channel bar 324 and the ear portion 304' are preferably made from sheet metal. The two are joined together at joint 328' through a tox clinching process (TOXO® Pressotechnik GMBH & Co. KG, Riedstrasse 4 D-88250, Weingarten, Germany, www.tox-us.com). In this embodiment, the two sheets of metal are layered together and placed over a circular cavity in a die resting in a tox press. A tox punch—essentially a cylindrical peg—is then driven into the sheet metal. The tox punch pushes and deforms the material into the cavity, which creates the cylindrical bump 336 on the other side of the sheet metal. The two metal sheets are thus tox clinched together; the ear portion 304' is now affixed to the channel bar 324. For a stronger joint, a rivet 338 is forced into the opening vacated by the withdrawn punch. No solder, weld, or adhesive is needed, and the tox joint 328' is a positive, reliable, mechanical connection. With the folded over edges 334' and the tox clinching joint 328', the ear portion 304' and bracket 302' will be secured to the channel bar 324 without any relative linear, rotational or twisting motion possible between the two.

FIG. 28 is a perspective view of an alternative embodiment hanger bar 340. This embodiment is essentially identical to the embodiment shown in FIG. 19 except that the joint 342 joining the brackets 302, 302' to the respective straight bar 326 and channel bar 324 is different. FIG. 29 is a perspective view of an alternative embodiment ear portion 304' wherein the shelf 322' is a flat plane, versus the preferred shelf in the ear portion of the FIG. 28 embodiment that features a 90-degree bend curving around the pointed end of the nail. As seen in FIGS. 30 and 31, the nail 312 is preferably canted or skewed away from the bars 324, 328 and the horizontal as in the FIG. 19 embodiment. FIG. 31 shows the joint 342 in greater detail.

As seen in FIG. 32, hanger bar 340 has been separated into its discrete component parts, namely, the channel bar 324 with the folded over edges 318, 320 forming the channel, the straight bar 326, and the two brackets 302, 302'. FIGS. 33, 34 are enlarged detailed views of the brackets 302, 302'. FIG. 34 shows the ear portion 304 with its folded over edges 334 not yet folded, which when folded would grip the straight bar 326 from its edges. The joint 342 in this embodiment is a tab 342 partially cut out of the ear portion 304, bent and passed through an opening or slot formed in an end of the straight bar 326 as seen in FIG. 34 where the tab 342 is bent over. Once the folded over edges 334 are bent into position to grip the end of the straight bar 326, the only movement possible is for the bar 326 to slide out of engagement with the ear potion 304. But once the tab 342 passes through slot 344 and is bent, the sliding action is disabled and the ear portion 304 cannot detach from straight bar 326. The joint 342 thus provides a positive and secure way to attach the bracket 302 to the end of the straight bar 326.

In FIG. 33 at the opposite end of the hanger bar 340, the joint 342' is a tab partially cut out of the end of the channel bar 324, wherein the tab 342' passes through an opening or slot 344' formed in the ear portion 304'. The not-yet-folded over edges 334' at this end now appear on the channel bar 324 instead of the ear portion 304' or 304 as with the opposite end of FIG. 34. Once the folded over edges 334' and the tab 342' are bent into their proper positions, the bracket 302' will be secured, immobilized, and affixed to the channel bar 324. The bracket 302' cannot move linearly, rotationally, or twist relative to the channel bar 324.

Figure 35:
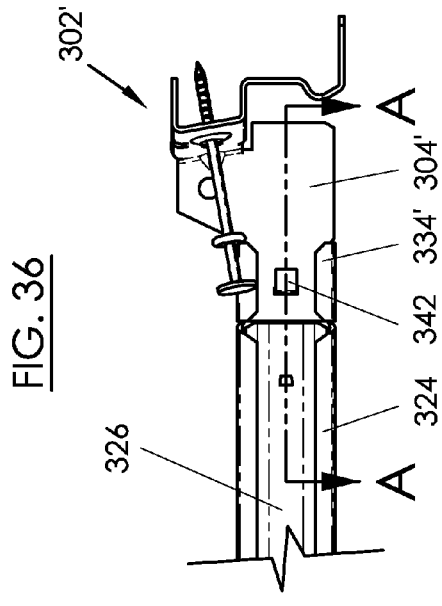
FIGS. 35 and 36 are detailed views of one end of the hanger bar from FIG. 28.
Figure 36:
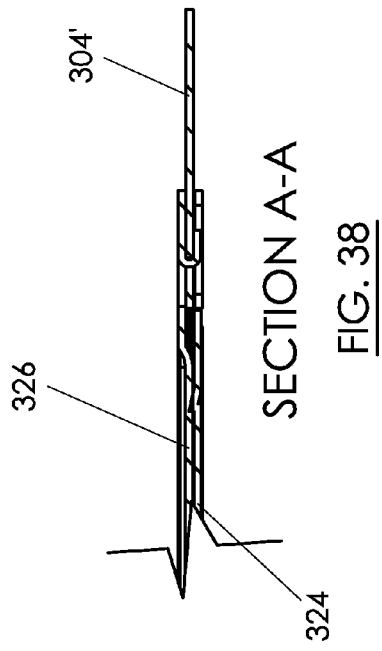
Figure 37:
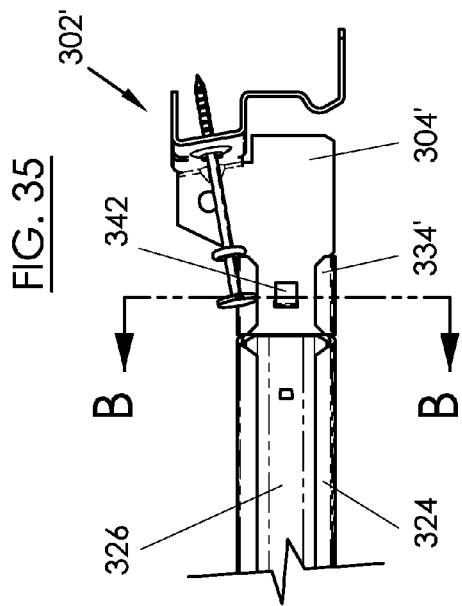
FIG. 37 is a cross-sectional view taken along line B-B of FIG. 35 which shows the hanger bar and the bumper portion at the opposite end of the hanger bar.
Figure 38:
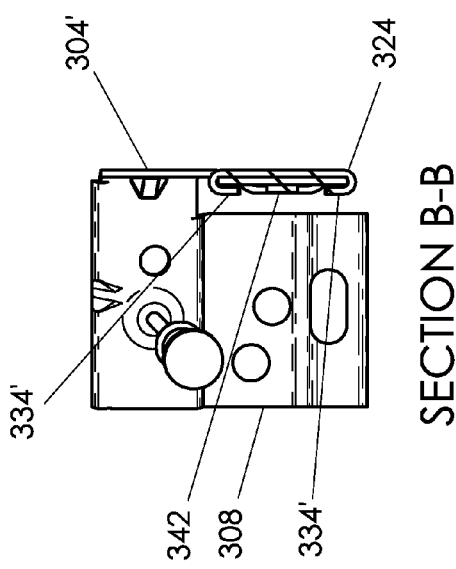
FIG. 38 is a cross-sectional view taken along line A-A of FIG. 36 showing an internal edge of the hanger bar.

FIG. 35 is a side elevational view of an end of the hanger bar 340 using a tab 342 to secure the bracket 302' to the channel bar 324. FIG. 37 is a cross-sectional view taken along line B-B of FIG. 35 to show the tab 342 folded over and the folded over edges 334' bent into place. FIG. 36 is a side elevational view of an end of the hanger bar 340 as in FIG. 35. FIG. 38 is a cross-sectional view taken along line A-A of FIG. 36. The tab 342 need not be rectangular as shown; other shapes are contemplated such as a simple peg, triangle, dimple, groove, pillbox, etc. The receiving slot 344 could be instead a groove or cavity and need not be a through hole as shown.

Of course, it is contemplated in various alternative embodiments that the disclosed tox or tab joints 328, 342 can be replaced by or used in combination with a spot weld, soldering, brazing, adhesives, one or more rivets, a bolt, a key, a roll pin, and the like, or a friction or wedge fit using the fold over edges to tightly grip the bar end.

Unless otherwise described herein, conventional materials and manufacturing methods may be used to make the members of the present invention. For example, the hanger bar is preferably stamped and cold formed from sheet metal, but other materials and manufacturing methods may be employed. The clip is typically detachable, as described previously, but may alternatively be formed as part of the bracket. Various other modifications may be made to the present invention without departing from the scope thereof. Although individual features of embodiments of the invention may be shown in some of the drawings and not in others, those skilled in the art will recognize that individual features of one embodiment of the invention can be combined with any or all of the features of another embodiment.

While particular forms of the invention have been described and illustrated, it will be apparent to those skilled in the art that various modifications can be made without departing form the spirit and scope of the invention. Accordingly, it is not intended that the invention be limited except by the appended claims.

We claim:

1. A hanger bar assembly for recessed lighting fixtures, comprising:
    a first bar having a channel;
    a second bar disposed within the channel, wherein the second bar moves within the channel for a telescoping action;
    a first bracket, the first bracket including a polygonal first ear portion leading to a first bent arm set at a skewed angle therefrom;
    means for joining the first bracket to an end of the first bar;
    a second bracket, the second bracket including a polygonal second ear portion leading to a second bent arm set at a skewed angle therefrom;
    means for joining the second bracket to an end of the second bar;
    wherein each of the first and second bent arms includes a downwardly extending bumper portion leading to a foot and the bumper portion provides a surface at an approximate right angle relative to the respective first and second bars, and the bent arms include respective nail holders each having a hole therein; and
    a nail engaging each nail holder wherein each nail extends at a skewed angle relative to the first and second bars.

2. A hanger bar assembly as defined in claim 1, wherein the skewed angle of the nail relative to the first and second bars is about 10 degrees ±1 degree.

3. A hanger bar assembly as defined in claim 1, wherein each of the brackets is prevented from pivoting by bent tabs partially enclosing the respective brackets.

4. A hanger bar assembly as defined in claim 1, wherein the means for joining the first and second brackets includes a tox joint.

5. A hanger bar assembly as defined in claim 4, wherein sheet metal is used to form portions of the first and second brackets, the tox joint includes multiple layers, and the sheet metal portions are press fitted together with a pin press fitted into the tox joint.

6. A hanger bar assembly as defined in claim 1, wherein at least one of the first and second brackets includes an opening and at least one of an end of the first and second bars includes a respective tab passing through the opening in the bracket, wherein the tab is bent at an angle.

7. A hanger bar assembly as defined in claim 1, wherein a shaft of the nail is angled away from the length of the bar.

8. A hanger bar assembly as defined in claim 7, wherein the shaft of the nail is angled downward.

9. A hanger bar assembly for recessed lighting fixtures, comprising:
    a first bar having at least one of a folded and curled edge forming a channel;
    a second bar disposed within the channel, wherein the second bar moves within the channel for a telescoping action;
    a first bracket attached to an end of the first bar, the first bracket including a polygonal first ear portion leading to a first bent arm set at an obtuse angle therefrom;
    a second bracket attached to an end of the second bar, the second bracket including a polygonal second ear portion leading to a second bent arm set at an obtuse angle therefrom;
    wherein each of the first and second bent arms includes a downwardly extending bumper portion leading to a foot and the bumper portion provides a surface at an approximate right angle relative to the respective first and second bars, and the bent arms include a concave nail holder having a hole therein; and
    a nail having a head and a point passing through the hole in the nail holder of the respective first and second bent arms, wherein the nail and head extend at an outward angle away from the respective first and second bars.

10. A hanger bar assembly as defined in claim 9, wherein the first bracket is attached to the end of the first bar by a sheet metal tox clinching joint.

11. A hanger bar assembly as defined in claim 9, wherein the first bracket is attached to the end of the first bar by an attachment joint wherein the joint includes an opening and a bent tab passing therethrough.

12. A hanger bar assembly as defined in claim 9, wherein the attachment affixes the first bracket to the end of the first bar so there is no relative movement.

13. A hanger bar assembly as defined in claim 9, wherein the nail and head extend at a downward angle.

14. A hanger bar assembly as defined in claim 9, wherein the nail and head extend at an outward angle of about 10.2 degrees away from the respective first and second bars.

15. A hanger bar assembly as defined in claim 13, wherein the nail and head extend at a downward angle of about 10 degrees from the horizontal.

16. A hanger bar assembly for recessed lighting fixtures, comprising:
- a first bar having at least one of a folded and curled edge forming a channel;
- a second bar disposed within the channel, wherein the second bar moves within the channel for a telescoping action;
- a first bracket including a polygonal first ear portion leading to a first bent arm set at an obtuse angle therefrom;
- means for attaching the first bracket to an end of the first bar so there is no relative motion,
- a second bracket attached to an end of the second bar, the second bracket including a polygonal second ear portion leading to a second bent arm set at an obtuse angle therefrom;
- wherein each of the first and second bent arms includes a shelf and a downwardly extending bumper portion leading to a foot and the bumper portion provides a surface at an approximate right angle relative to the respective first and second bars, and the bent arms include a concave nail holder having a hole therein; and
- a nail having a head and a point passing through the hole in the nail holder of the respective first and second bent arms and extending between the shelf and the bumper portion, wherein the nail and head extend at an outward angle away from the respective first and second bars and a downward angle.

17. A hanger bar assembly for recessed lighting fixtures according to claim 16, wherein the means for attaching the first bracket to an end of the first bar includes at least one of a sheet metal tox joint, a rectangular tab passing through an opening between the first bracket and the end of the first bar, a riveted joint, a spot weld, a solder joint, and adhesive bonded joint.

18. A hanger bar assembly for recessed lighting fixtures according to claim 16, wherein the shelf is bent at an angle about the nail.

19. A hanger bar assembly for recessed lighting fixtures according to claim 18, wherein the shelf is bent at 90 degrees.

20. A hanger bar assembly for recessed lighting fixtures according to claim 16, wherein the first bracket and the first bar are fabricated from separate and discrete pieces of sheet metal.

* * * * *